US012270531B2

(12) United States Patent
Zimmer

(10) Patent No.: US 12,270,531 B2
(45) Date of Patent: Apr. 8, 2025

(54) MOUNT FOR A LIGHTING DEVICE

(71) Applicant: Trent Zimmer, Broussard, LA (US)

(72) Inventor: Trent Zimmer, Broussard, LA (US)

( * ) Notice: Subject to any disclaimer, the term of this patent is extended or adjusted under 35 U.S.C. 154(b) by 0 days.

(21) Appl. No.: 17/826,539

(22) Filed: May 27, 2022

(65) Prior Publication Data

US 2022/0381426 A1 Dec. 1, 2022

Related U.S. Application Data

(60) Provisional application No. 63/194,341, filed on May 28, 2021.

(51) Int. Cl.
*F21V 21/08* (2006.01)
*F21V 17/10* (2006.01)
*F21V 21/096* (2006.01)

(52) U.S. Cl.
CPC ........ *F21V 21/0816* (2013.01); *F21V 21/096* (2013.01); *F21V 17/105* (2013.01); *F21V 21/0965* (2013.01)

(58) Field of Classification Search
CPC ............. F21V 21/0816; F21V 21/0965; F21V 21/096; F21V 21/084; F21V 21/0885; F21V 17/105; F21V 17/12
See application file for complete search history.

(56) References Cited

U.S. PATENT DOCUMENTS 5,251,118 A * 10/1993 Budnovitch .......... F21V 21/116 362/453
6,932,487 B2 * 8/2005 Aknine ................. F21V 21/084 362/365
7,575,347 B1 * 8/2009 Daly ................... F21V 33/0084 362/398
7,611,255 B1 * 11/2009 Lagassey ............ F21V 21/0885 362/396
7,857,478 B1 * 12/2010 Keller ................. F21V 21/0816 362/108
2003/0058637 A1 * 3/2003 Hsien .................. F21V 21/0965 362/187
2005/0157488 A1 * 7/2005 Ford ................... F21V 21/0816 362/105

(Continued)

FOREIGN PATENT DOCUMENTS

WO WO-2019222259 A1 * 11/2019 .............. F21V 15/01

*Primary Examiner* — William N Harris
*Assistant Examiner* — James M Endo
(74) *Attorney, Agent, or Firm* — Asgaard Patent Services, LLC; F. Wayne Thompson, Jr.

(57) ABSTRACT

Disclosed are implementations of a mount used to attach a lighting device to an object or surface. The lighting device includes a cover attached to a base plate, where the cover includes a circumferential ledge. The mount includes a central opening through which the cover of the lighting device can extend. The central opening is bounded by a circumferential rim adapted to overlap the circumferential ledge of the lighting device. At least two of the mount's four sides include a receiving space configured to receive a strap, each of the mount's corners includes a tiedown aperture configured to permit a flexible tiedown to be looped there-through, and a plurality of magnets are positioned in the underside of the mount. Also disclosed are methods for using the mount to attach the lighting device to an object or surface.

5 Claims, 8 Drawing Sheets

(56) References Cited

U.S. PATENT DOCUMENTS

| | | | | |
|---|---|---|---|---|
| 2011/0304269 | A1* | 12/2011 | Wang | F21K 9/00 315/113 |
| 2012/0057331 | A1* | 3/2012 | Janice | F21V 21/0885 362/374 |
| 2012/0218760 | A1* | 8/2012 | Nagaoka | F21V 3/062 362/249.02 |
| 2012/0236563 | A1* | 9/2012 | Breidenassel | F21V 17/14 362/249.02 |
| 2012/0284968 | A1* | 11/2012 | Johnson | H01F 7/0263 362/108 |
| 2012/0293997 | A1* | 11/2012 | Zaderej | F21V 15/01 362/235 |
| 2012/0300439 | A1* | 11/2012 | Davis Hatfield | F21V 21/0816 362/249.02 |
| 2014/0192541 | A1* | 7/2014 | Hoetzl | F21K 9/20 362/374 |
| 2015/0009691 | A1* | 1/2015 | Sandoval | F21V 15/005 29/525.01 |
| 2015/0062886 | A1* | 3/2015 | Leegate | A42B 3/044 362/190 |
| 2015/0362155 | A1* | 12/2015 | Thomsen | F21V 5/008 362/268 |
| 2016/0338337 | A1* | 11/2016 | Waldman | A01M 29/18 |
| 2018/0310656 | A1* | 11/2018 | Ford | A42B 3/0453 |
| 2019/0277479 | A1* | 9/2019 | Shih | F21V 17/105 |
| 2020/0172212 | A1* | 6/2020 | Christensen | F21V 23/0435 |

* cited by examiner

MOUNT FOR A LIGHTING DEVICE

CROSS REFERENCE TO RELATED APPLICATION

This application claims the benefit of U.S. Provisional Application Ser. No. 63/194,341, filed on May 28, 2021, the entirety of which is incorporated herein by reference.

TECHNICAL FIELD

This disclosure relates to implementations of a mount for a lighting device, and methods of using the mount to attach the lighting device to an object or surface.

BACKGROUND

Lighting devices are used for a variety of purposes. Some lighting devices, such as the SPARK Marker light sold by Unity Tactical, are designed for attachment to a helmet, or other surface, using hook-and-loop fasteners. However, there may be use cases where it is desirable to mount such a lighting system to an object (e.g., PALS webbing) or surface (e.g., a magnetic surface) that does not include hook-and-loop fasteners.

Accordingly, it can be seen that needs exist for the mount disclosed herein. It is to the provision of a mount for a lighting device configured to address these needs, and others, that the present invention is primarily directed.

SUMMARY OF THE INVENTION

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed are implementations of a mount used to attach a lighting device to an object or surface. An example lighting device comprises a cover attached to a base plate, where the cover includes a circumferential ledge.

An example mount comprises: a central opening through which the cover of the lighting device can extend, four sides, and four corners. The central opening is bounded by a circumferential rim adapted to overlap the circumferential ledge of the lighting device. At least two of the four sides include a receiving space configured to receive a strap. Each of the four corners includes a tiedown aperture configured to permit a flexible tiedown to be looped therethrough, each tiedown aperture comprising an opening extending through the mount. A plurality of magnets are positioned in the underside of the mount.

An example method of using the mount comprises: providing the example mount described above; positioning the mount on the lighting device such that the cover extends through the central opening of the mount and the circumferential rim overlaps the circumferential ledge of the cover; and securing the mount to an object or surface.

BRIEF DESCRIPTION OF THE DRAWINGS

Like reference numerals refer to corresponding parts throughout the several views of the drawings.

DETAILED DESCRIPTION

Figure 1:
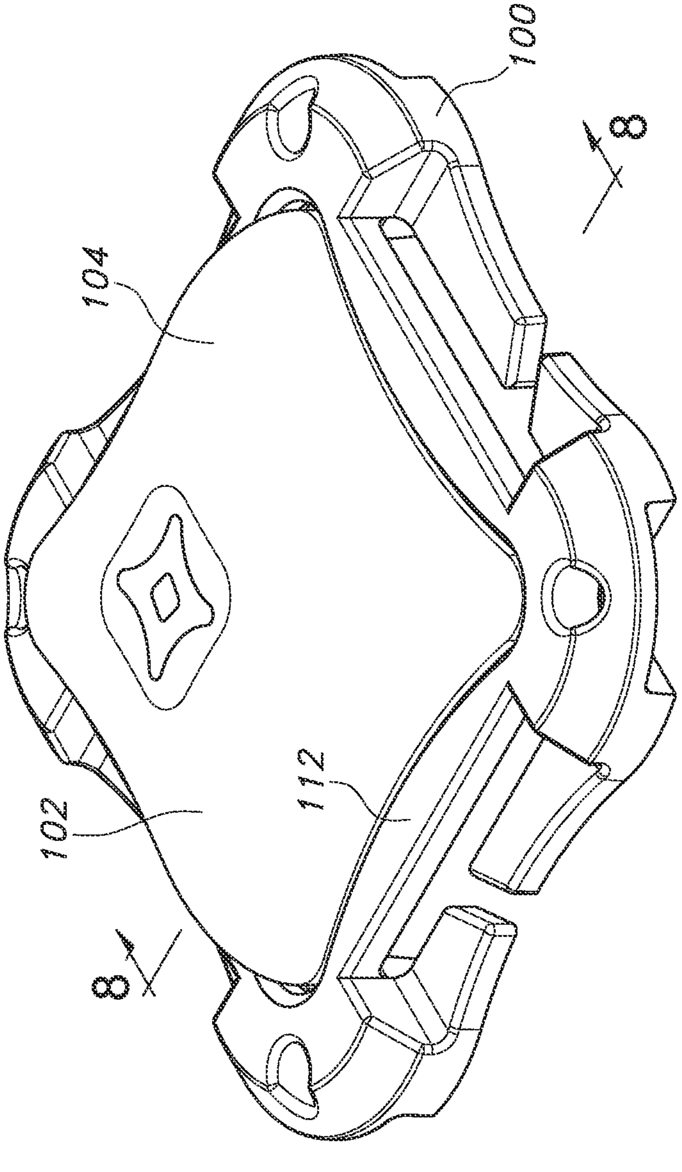
FIG. 1 illustrates a perspective view of an assembly comprising a mount, according to the principles of the present disclosure, positioned on an example lighting device.
Figure 2:
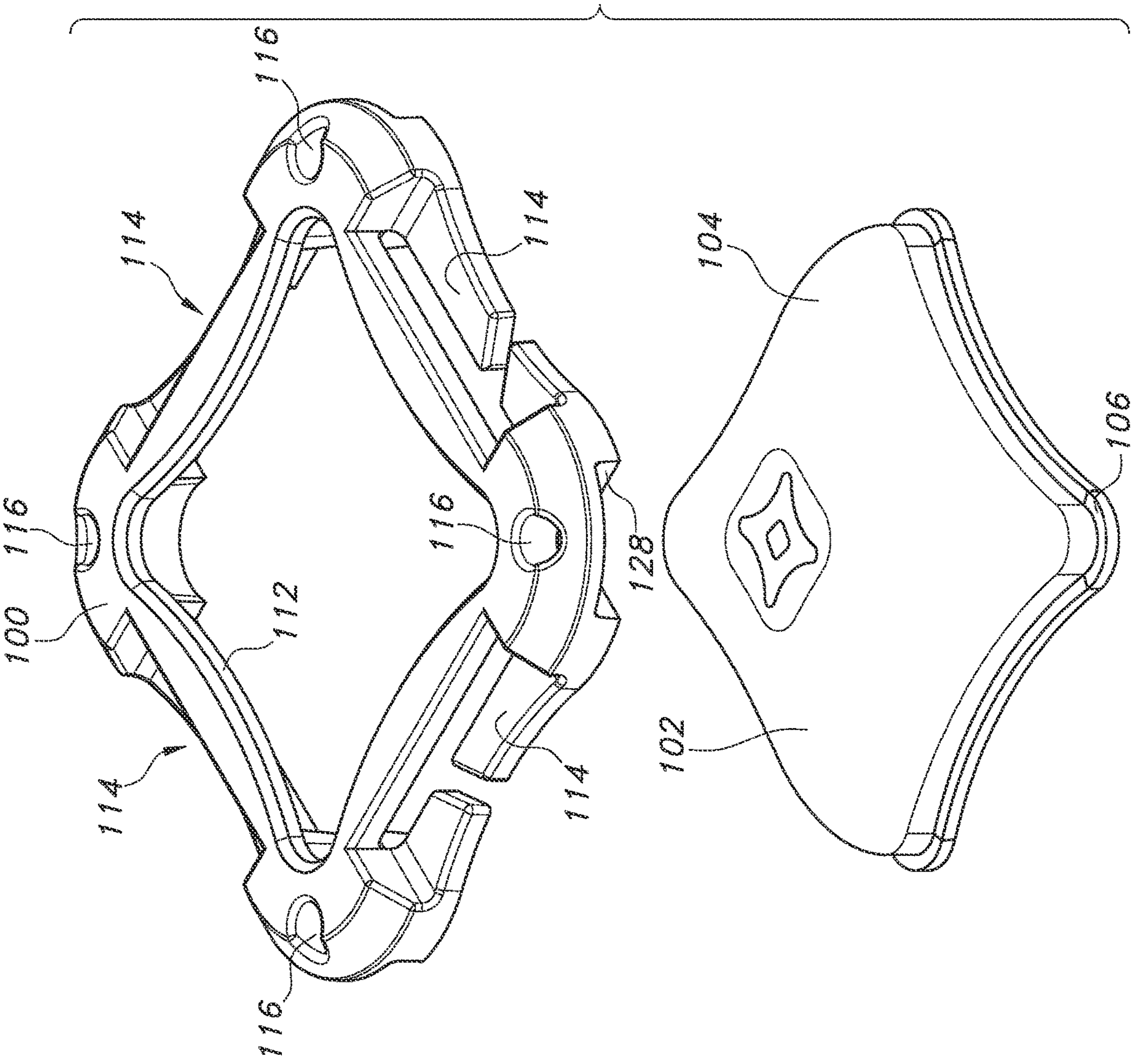
FIG. 2 illustrates an exploded view of the assembly shown in FIG. 1.
Figure 3:
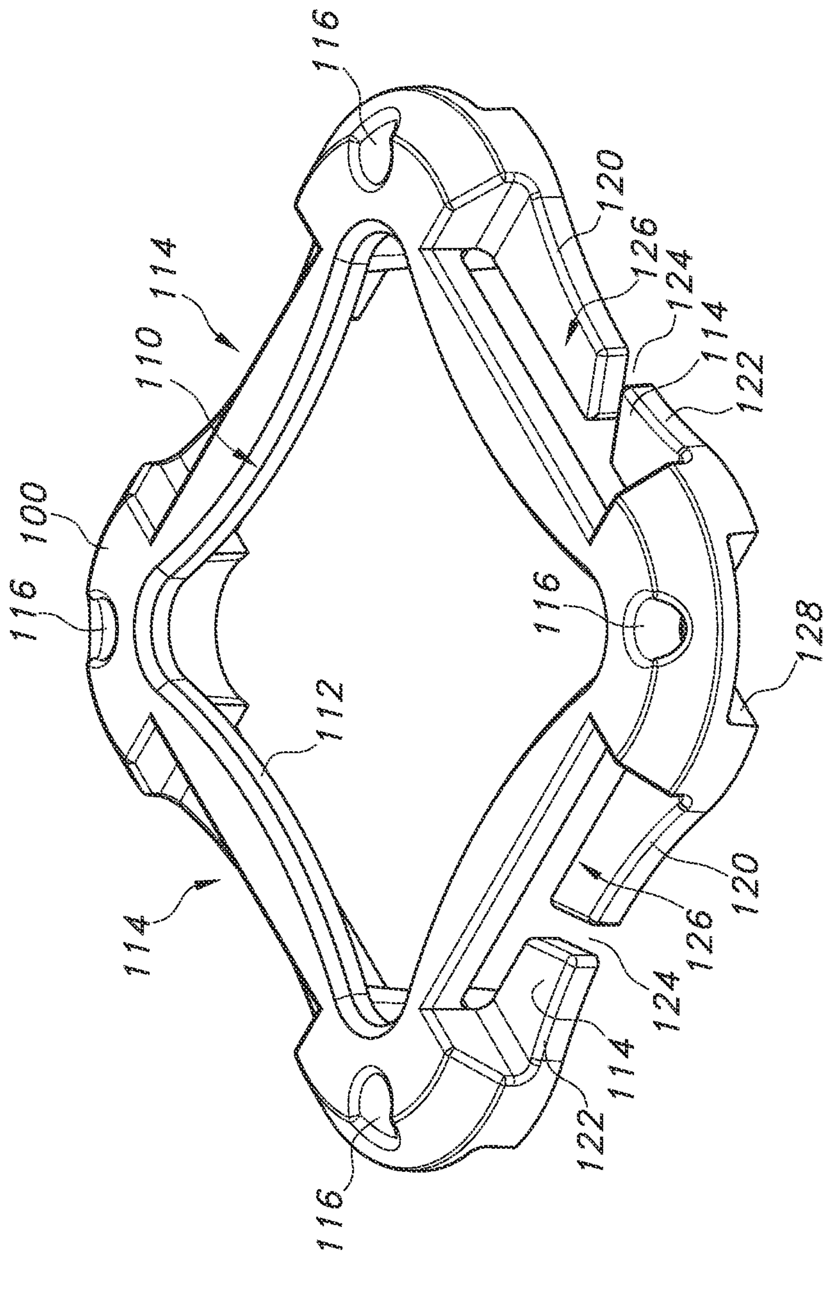
FIG. 3 illustrates an isometric view of the mount shown in FIGS. 1 and 2.
Figure 4:
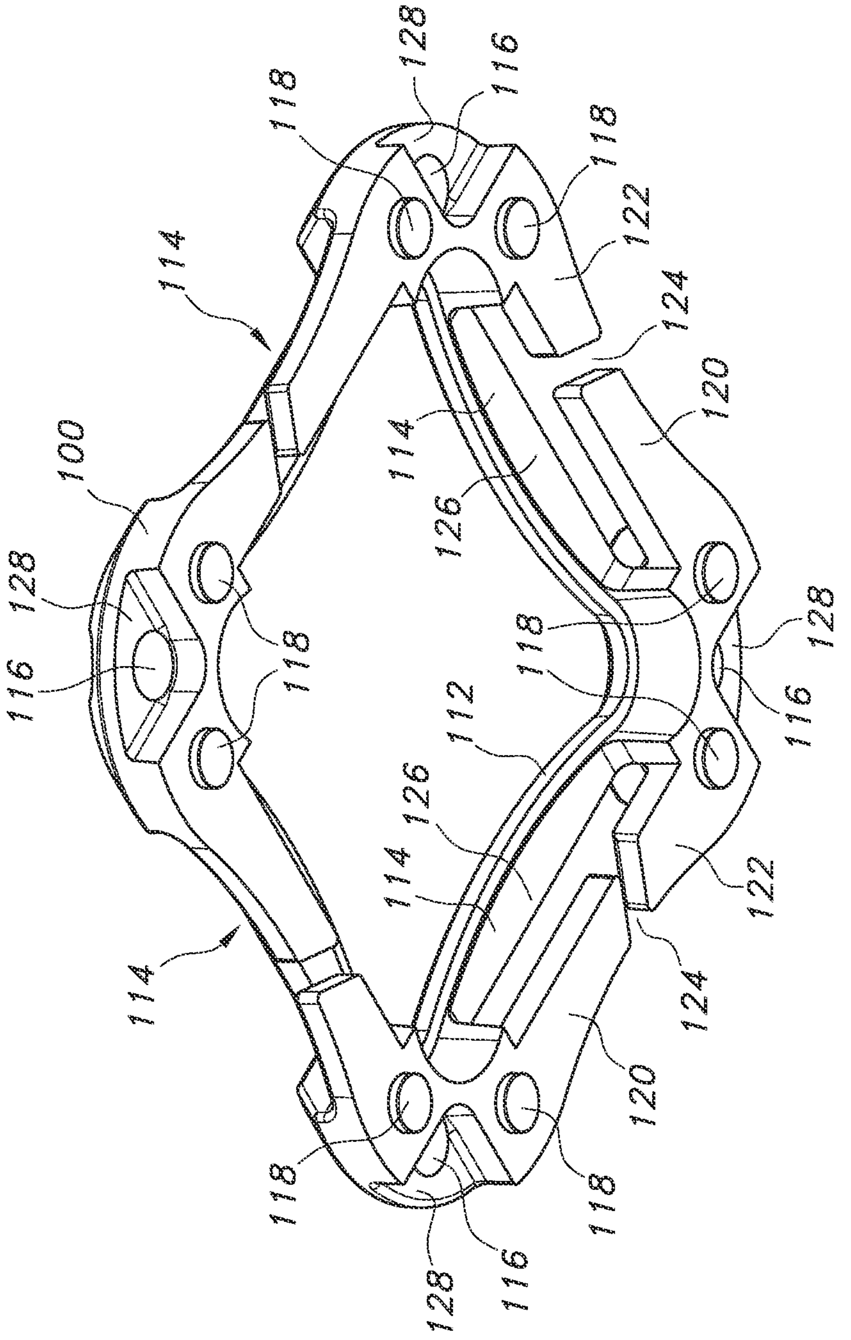
FIG. 4 illustrates another isometric view of the mount shown in FIG. 3.
Figure 5:
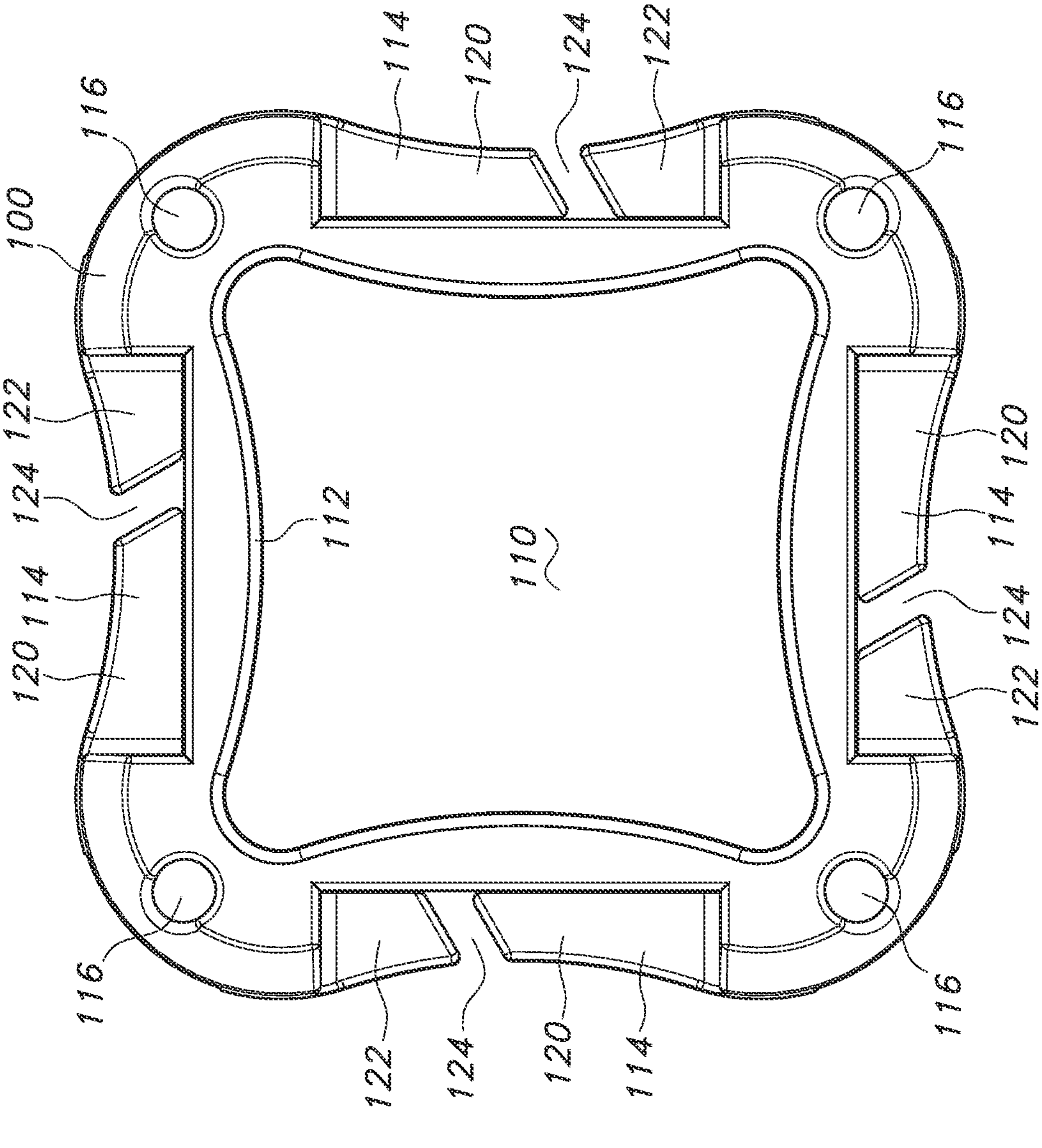
FIG. 5 illustrates a top plan view of the mount shown in FIG. 3.
Figure 6:
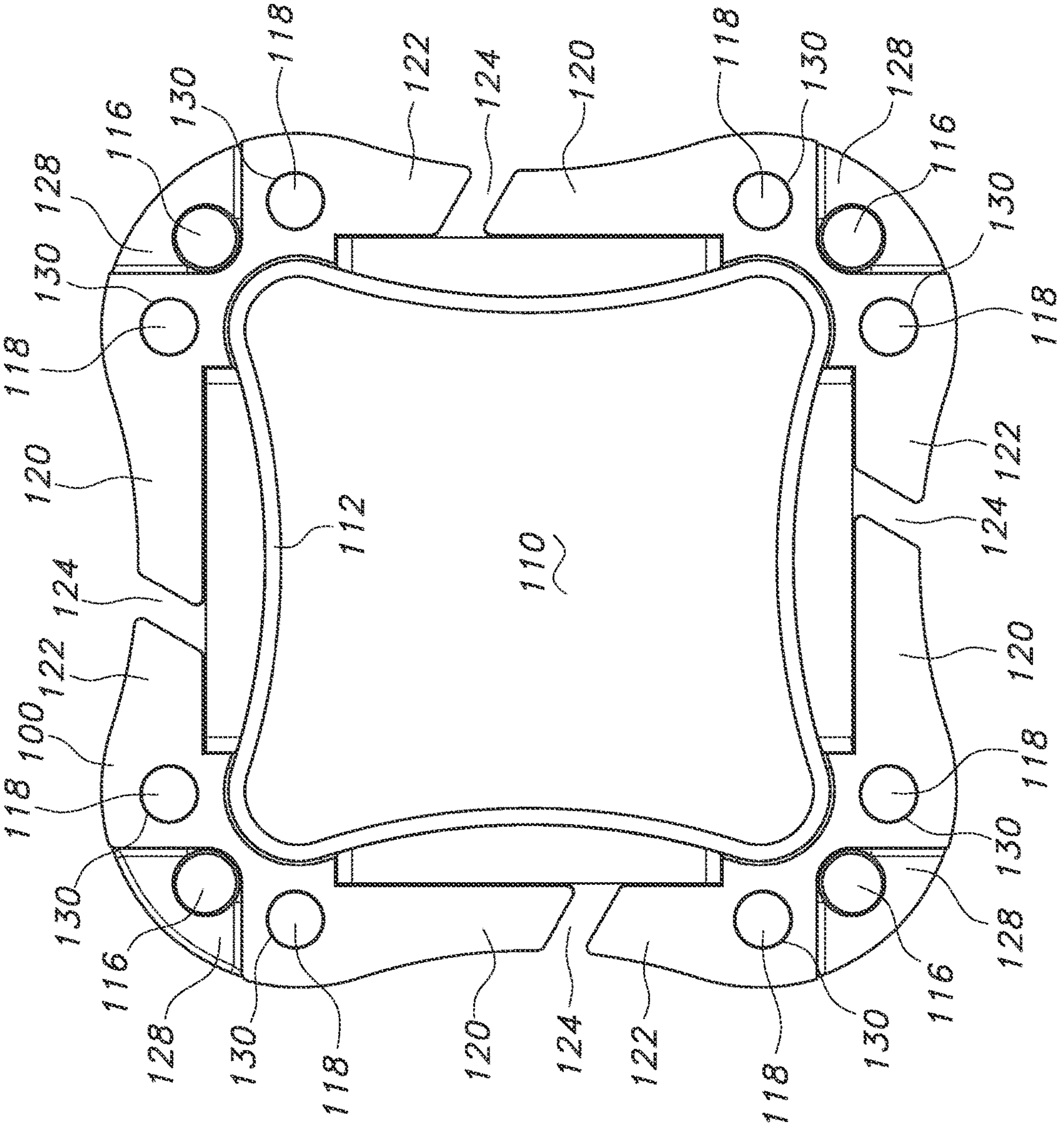
FIG. 6 is a bottom plan view of the mount shown in FIG. 3.
Figure 7:
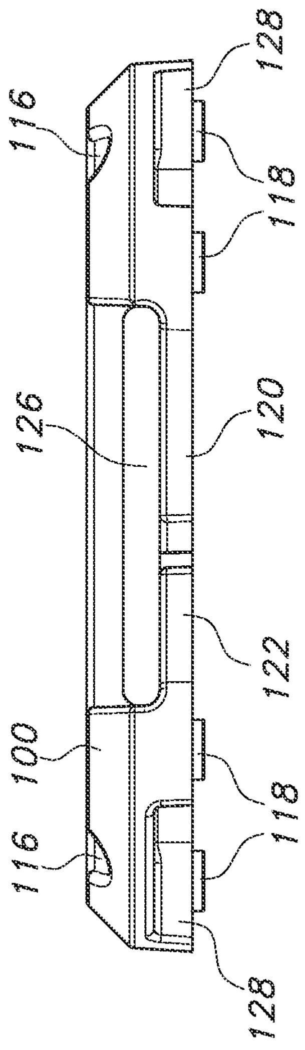
FIG. 7 is a side elevational view of the mount shown in FIG. 3.
Figure 8:
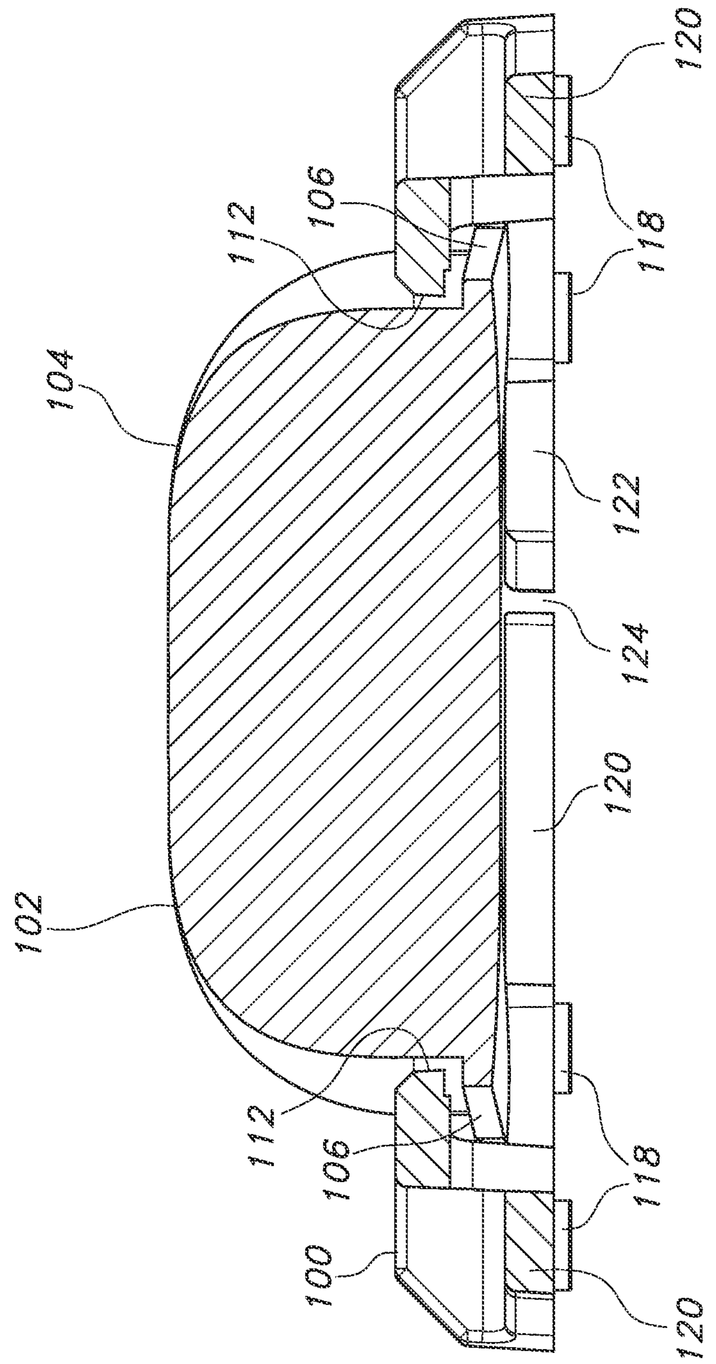
FIG. 8 is a cutaway view of the assembly shown in FIG. 1.

FIGS. 1-7 illustrate an example mount 100 for a lighting device according to the principles of the present disclosure. As shown in FIGS. 1 and 2, the mount 100 can be used to attach a lighting device 102 to an object or surface. The example lighting device 102 is the same as, or similar to, the lighting system described in U.S. patent application Ser. No. 15/264,626, filed on Sep. 14, 2016, entitled "HELMET MOUNTED LIGHTING SYSTEM", by Trent Zimmer, which is owned by the applicant of the present application and is hereby expressly incorporated by reference as if fully set forth herein. However, it should be understood that the mount 100 could be adapted for use with other lighting devices.

As shown best in FIG. 2, the example lighting device 102 comprises a cover 104 attached to a base plate. The cover 104 of the lighting device 102 includes a circumferential ledge 106.

As shown in FIGS. 1-6, the mount 100 comprises a central opening 110 through which the cover 104 of the lighting device 102 extends. The central opening 110 is bounded by a circumferential rim 112 adapted to overlap and, in some implementations, bear against the circumferential ledge 106 of the cover 104 while the mount 100 is being used to secure the lighting device 102 to an object or surface.

As shown best in FIGS. 3-7, the mount 100 further comprises a securing member 114 on each side, a tiedown aperture 116 in each corner, and a plurality of magnets 118 on the underside. In this way, the mount 100 can be used to attach the lighting device 102 to an object (e.g., PALS webbing) or surface (e.g., a magnetic surface). However, it should be understood that the mount 100 could be manufactured without one, or even two, of the above listed means of attachment 114, 116, 118 without departing from the scope of the present invention.

The securing members 114 can be used to attach the mount 100, and thereby the lighting device 100, to PALS webbing, or another similarly sized strap. Each of the securing members 114 includes a pair of guide arms 120, 122 that extend inwardly toward each other. The guide arms 120, 122 do not contact each other at a distal end thereof, but leave a space 124 therebetween. The space 124 forms an entrance to the securing member 114. The guide arms 120, 122 also define a receiving space 126 that is configured (i.e., sized) to receive PALS webbing, or another similarly sized strap (e.g., One-Wrap® straps), therein. While the exemplary mount 100 has a securing member 114 on each side, other implementations of the mount 100 may only have a securing member 114 on two sides.

Each tiedown aperture 116 acts as a point of securement for the mount 100. Each tiedown aperture 116 is configured to permit a length of cord, or wire, to be looped therethrough and secured about an object. More specifically, each of the tiedown apertures 116 comprises an opening that extends through a corner of the mount 100 and a fan-shaped inlet 128 in the underside of the mount 100 (see, e.g., FIG. 6). However, it should be understood that another inlet shape suitable for a cord, or wire, to pass therethrough could be used. While the exemplary mount 100 has four tiedown apertures 116, other implementations of the mount 100 may have fewer than four tiedown apertures 116.

The plurality of magnets 118 in the underside of the mount 100 are used to secure the mount 100 to a ferromagnetic object or surface. A pair of magnets 118 are positioned adjacent each tiedown aperture 116 of the mount 100. Each magnet 118 is retained in a recessed socket 130 formed in the underside of the mount 100. When the mount 100 is manufactured, each recessed socket 130 is formed about a magnet 118. However, in some implementations, each magnet 118 is held in a recessed socket 130 by friction, an adhesive, or a combination thereof. The example magnets 118 are disk-shaped. However, it should be understood that other magnet shapes are equivalent and may be substituted. Each magnet 118 is of the well-known rare-earth variety (e.g., neodymium magnet or samarium-cobalt magnet). While the exemplary mount 100 has eight magnets 118 in the underside thereof, other implementations of the mount 100 may have fewer than eight magnets 118.

The above described means of attachment 114, 116, 118 can be used individually, or in combination, to attach a lighting device 102 to an object or surface.

In general, the mount 100 works by capturing the lighting device 102 between the mount 100 and the object or surface, to which the lighting device 102 is being attached. The mount 100 captures the lighting device 102 due to the circumferential rim 112 overlapping and bearing against the circumferential ledge 106 of the lighting device 102 while one or more means of attachment 114, 116, 118 secure the mount 100, and thereby the lighting device 102, to the object, or surface, of interest.

As a nonlimiting example, two securing members 114 positioned on opposite sides of the mount 100 could be used in conjunction with PALS webbing to attach the mount 100, and thereby the lighting device 102, to an object or surface.

As another nonlimiting example, the four tiedown apertures 116 could be used in conjunction with parachute cord to attach the mount 100, and thereby the lighting device 102, to an object or surface. However, another combination of tiedown apertures 116, such as two tiedown apertures 116 positioned diagonally across from each other, could be used instead.

As yet another nonlimiting example, the plurality of magnets 118 could be used to attach the mount 100, and thereby the lighting device 102, to a vehicle, or other ferromagnetic object or surface.

Injection molding or 3D printing can be used to manufacture the mount 100. The mount 100 is made of nylon, though other suitable plastics could be used.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A mount configured to capture a lighting device between the mount and an object or surface, the lighting device comprising a cover attached to a base plate, the cover includes a circumferential ledge, the mount comprising:

a central opening through which the cover of the lighting device can extend;

four sides; and four corners;

wherein:

the central opening is bounded by a circumferential rim adapted to overlap the circumferential ledge of the lighting device;

at least two of the four sides include a receiving space configured to receive a strap;

each of the four corners includes a tiedown aperture configured to permit a flexible tiedown to be looped therethrough, each tiedown aperture comprising an opening extending through the mount; and a plurality of magnets are positioned in an underside of the mount.

2. The mount of claim 1, wherein each receiving space comprises a pair of guide arms that extend inwardly toward each other, the pair of guide arms do not contact each other at their distal ends, but leave a space therebetween that forms an entrance into the receiving space.

3. The mount of claim 1, wherein each tiedown aperture further comprises a fan-shaped inlet in the underside of the mount, and together the opening and the fan-shaped inlet are configured to permit a flexible tiedown to be looped therethrough.

4. The mount of claim 1, wherein each of the plurality of magnets is retained in a recessed socket formed in the underside of the mount.

5. A method of using a mount to capture a lighting device between the mount and an object or surface, the lighting device comprising a cover attached to a base plate, the cover includes a circumferential ledge, the method comprising:

providing a mount comprising a central opening through which the cover of the lighting device can extend, four sides, and four corners, wherein: the central opening is bounded by a circumferential rim adapted to overlap the circumferential ledge of the cover; at least two of the four sides include a receiving space configured to receive a strap; each of the four corners includes a tiedown aperture configured to permit a flexible tiedown to be looped therethrough, each tiedown aperture comprising an opening extending through the mount; and a plurality of magnets are positioned in an underside of the mount;

positioning the mount on the lighting device such that the cover extends through the central opening of the mount and the circumferential rim overlaps the circumferential ledge of the cover; and securing the mount to an object or surface.

* * * * *